May 3, 1949.  R. H. SHEPPARD  2,469,085
HYDRAULIC POWER TRANSMISSION
Filed March 20, 1944  2 Sheets-Sheet 1
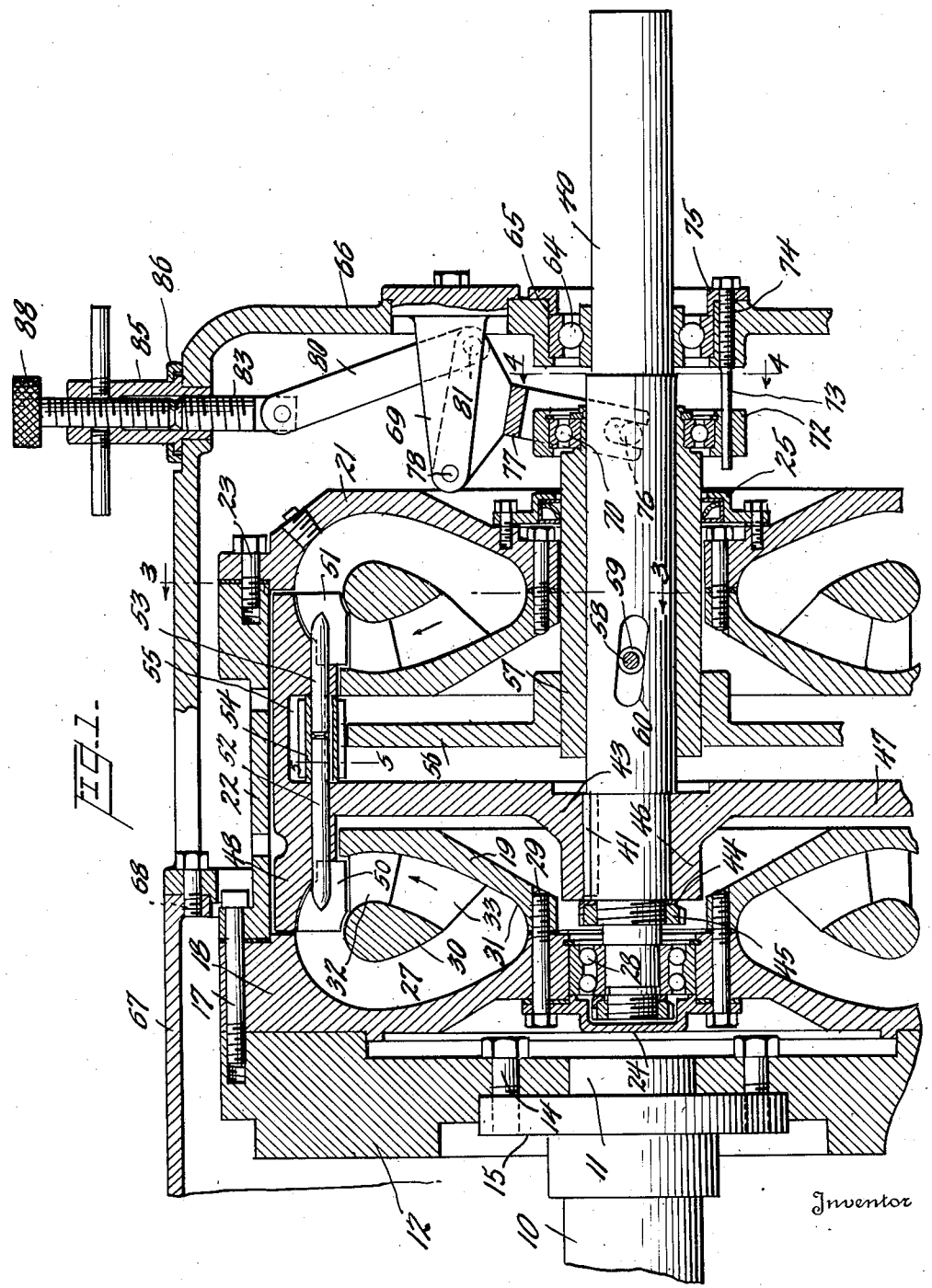
Inventor
Richard H. Sheppard,
By Henry H. Snelling, Attorney May 3, 1949.  R. H. SHEPPARD  2,469,085
HYDRAULIC POWER TRANSMISSION
Filed March 20, 1944  2 Sheets-Sheet 2
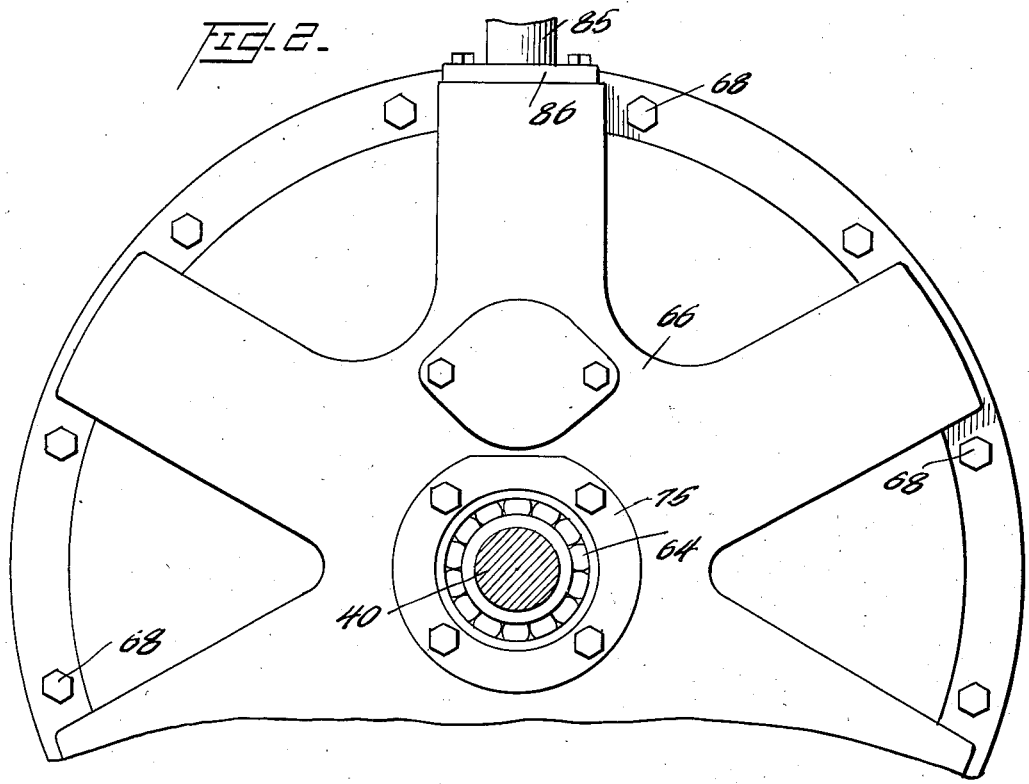
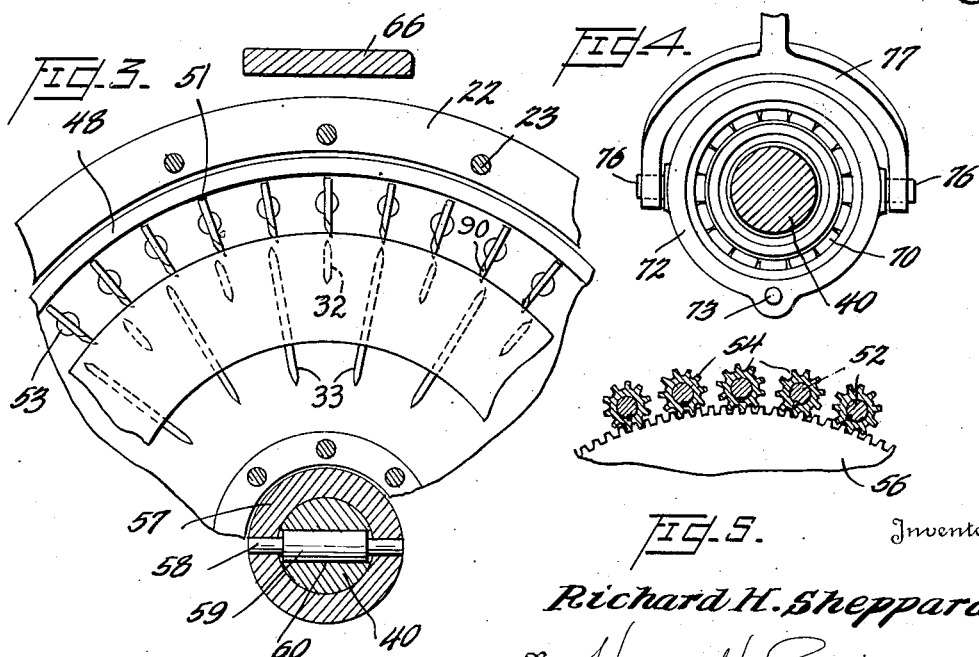
Inventor
Richard H. Sheppard,
By Henry H. Snelling
Attorney Patented May 3, 1949

2,469,085

UNITED STATES PATENT OFFICE 2,469,085

HYDRAULIC POWER TRANSMISSION

Richard H. Sheppard, Hanover, Pa.

Application March 20, 1944, Serial No. 527,316

4 Claims. (Cl. 60—54)

This invention relates to power plants of the hydraulic type, fluid transmission, in which the output shaft is driven by a turbine. It has for its principal object the provision of a hydraulic transmission which will provide infinitely varying speeds in one direction of rotation, together with a neutral position and being capable of reversing the output shaft when the control means is moved past the neutral position.

A second object of the present invention is to simplify such transmissions and to provide for a greater speed of the output shaft than of the input shaft and for giving a high torque at the lower speeds. Still further objects of the invention concern the improvement of specific details of the apparatus, and the provision of certain new combinations of parts as particularly pointed out in the claims.

Described very briefly, the transmission consists of two spaced torus chambers nearly filled with oil and rotated by and with the drive or engine shaft. The fluid rotates in two circular motions, the first being imparted by the rotation of the drive shaft and the second being imparted by the action of the impeller blades and centrifugal force. The driven turbine is located between the two annular chambers and is provided with vanes in the path of the rotating fluid and movable to provide the desired range of speed and direction of the driven shaft on which the rotor of the turbine is secured. The rotor vanes of the turbine are at least one in number greater (or less) than the impeller blades and may be altered in position while the device is in operation, either manually or by automatic control, the type of which may vary with the particular kind of service for which the unit may be designed.

In the drawings:

Figure 1 is a central section.

Figure 2 is an elevation looking toward the driven or output shaft.

Figure 3 is a section on line 3—3 of Figure 1, thru the core of the impeller chamber to illustrate the vane regulating means.

Figure 4 is a section on line 4—4 of Figure 1.

Figure 5 is a section on line 5—5 of Figure 1 showing five of the vane moving pinions.

Starting at the left of Figure 1, 10 represents the drive shaft having a boss 11 snugly fitting a hole in the head 12 secured as by the screws 14 to the hub flange 15 of the engine or drive shaft 10. To this head 12 as by means of the sixteen elongated screws 17 is secured a driving unit made up of four circular shells, 18 to 21, and a cylindrical member 22 secured as at 23 to the distant or front shell 21. The central portions of the unit are closed against fluid leakage by a cover 24 at the rear and by an oil retainer 25 at the front, the latter receiving the driven shaft and the sleeve which surrounds and rotates with it.

The first or rear shell 18 has within it a circular groove 27 forming half of the impeller chamber in which the oil or other hydraulic fluid rotates. At its center the shell 18 carries the outer race of a ball bearing 28, the inner race of which is mounted on the driven shaft near its end. The second shell 19 is secured to shell 18 as at 29 and its annular groove 31 completes the major part of the impeller chamber. This member or shell carries the core or torus 30 spaced from the margin of the groove 31 by a series of short and long blades 32 and 33 which cause the oil to flow in the direction of the arrow, whirling around the core 30 as a center. In the transmission illustrated which is about 18″ in diameter and a bit shorter in length, there are 34 impeller blades, alternately long and short, fixed equally spaced about the shell as best seen in Figure 3, which shows these members in relation to the movable vanes of the turbine rotor. These latter vanes are spaced 10° apart so that in each half or 180° there is one more vane than the number of blades.

To avoid the shock that would occur if the turbine blades and impeller blades were alike in number, either set is made at least one greater in number than the other. In this way the greatest number of power impulses per revolution consistent with maximum smoothness of operation can be secured.

The driven shaft 40 at its end nearest the flywheel or head 12 turns in the ball bearing 28. Near this rear point the key or spline 41 secures the rotor 43 to the driven shaft and is held in place by washer 44 and nut 45. From the hub flange 46 of the rotor rises the plate 47 ending in a T-shaped peripheral head 48, extending between the shells 18 and 21 of the impeller unit and carrying the movable vanes 50 and 51.

The vanes 50 and 51 are alike except that they are oppositely or reversely curved at their bottoms whereby the action in the two vortex chambers will be the same. Each vane has its spindle 52 or 53 journalled in the rotor head 48, and the two spindles of each pair are keyed or otherwise secured to a pinion 54 in the central recess 55. All of the thirty-six pinions are engaged by a positioning gear 56 on sleeve 57 axially movable along the driven shaft and having a six degree rotative movement with respect thereto on either side of a neutral position. Such movement is sufficient to move the vanes 50 and 51 thru a large arc and is obtained by the pin, roller, and slot connection indicated at 58, 59 and 60. The front face of rotor 43 is centrally recessed slightly to accommodate the end of the sleeve 57 in its extreme left or rear position. It will be noted that the gear 56 is parallel to the disk portion 47 of the rotor and has an extended hub flange tightly fitting the sleeve 57.

The front bearing 64 for the driven shaft 40 is mounted in a central opening 65 in the six-armed spider 66 secured to the housing 67 as by the screws 68. This spider also serves to support a bracket 69 which affords the pivot for the sleeve shifting mechanism by means of which the desired speed and direction of rotation of the driven or output shaft 40 is secured.

Ball bearing races for bearing 70 of the speed changing ring 72 are locked respectively to a reduced seat on sleeve 57 and to the ring 72 which is supported in part by an extension 73 of one of the screws 74 holding the retainer 75 for the bearing 64. The ring 72 has a pair of oppositely directed pins or studs 76 engaged by the slot in the fork 77 pivoted at 78 to the bracket 69 and joined at about the same level to the link 80 by a pivot pin 81. A raising or lowering movement of the link 80 is given by plunger 83 threaded to the capstan 85 turning in the arm of the spider and in a retaining plate 86 bolted to the arm. When accurately adjusted the plunger can be locked in place by the knurled lock knob 88. As will be seen, a rocking of the fork 77 will shift the bearing ring 72 and consequently the sleeve, and this in turn will rotate the sleeve by means of the roller pin and slot connection with the driven shaft, and this will move all of the turbine vanes thru as much as 180°. When the vanes are in angular position in neutral setting the flow of oil or other liquid over them will have no tendency to propel them either forward or backward, the friction of flow being overcome by a slight backward setting, that is by tilting the vanes by a few degrees.

Since the hydraulic fluid travels in opposite directions in the two impeller or torus chambers and the vanes are always at similar angles, there is no tendency to shift the position of the runner or turbine axially so there is no need for thrust bearings. In use, the small amount of air in the two chambers is all collected at the bottom of the cavities or chambers because of the centrifugal action on the heavier fluid such as the oil and the air therefore acts as a cushion allowing for the changes in temperature in the device.

The action of the transmission is as follows: Power from any source turns the fly wheel 12 and the drive shaft 10, and with it the impeller unit including the two spaced sets of blades 32 and 33. These alternately short and long blades cause the hydraulic fluid which nearly fills the two torus or impeller chambers to revolve with the unit as it accelerates. The increase in rotative speed drives the air to the center as the fluid is forced outwardly from the axis by centrifugal action. As seen in Figure 1, this causes a reverse or oppositely directed flow in the two impeller chambers in the direction of the arrows by reason of the displacement of the relatively inert fluid in the open portions 27 of the chambers where the friction with the walls is wholly insufficient to cause the fluid to rotate with the unit as it gains in speed. Thus the displacement of the fluid in space 27 by the pressure due to centrifugal action, plus the rotation of the fluid confined between the two sets of blades 32 and 33, causes the hydraulic fluid to have two circular motions at the same time in each of the two compartments or chambers, the first being imparted by rotation of the drive shaft and in a plane perpendicular to it while the second circular motion is added as the speed increases and is due to the unbalance between the rotating fluid between the blades and the fluid in that portion where there are no blades, and this second rotation will take place in opposite directions in the two torus chambers but always from the blades toward the perimeter. This displacing fluid is, therefore, carried over the turbine vanes 50 and 51 to the portion 27 free of the blades and then downwardly back to the lower edges of the longer blades.

If we now assume that the vanes of the turbine are radially positioned, the turbine gradually picks up speed and soon revolves substantially at the same rate as the driving shaft in a well known manner. The curved bevelling of the vanes, indicated at 90, naturally oppositely directed in the two chambers, increases the tendency of the rotor to follow the impeller when the latter is first starting. When the vanes of the turbine rotor are tilted from the radial position, that is, when the receiving edges of the vanes are moved somewhat toward or with the direction of rotation of the drive shaft and impeller unit, each blade will receive an added impetus by reason of the flow of the hydraulic fluid against and over it. This added force will, therefore, drive the rotor of the turbine further in the direction of rotation than if the vanes were radial.

If, on the other hand, the receiving edges of the vanes are inclined in the opposite direction, either manually by the mechanism shown, or by automatic control, so that they now are inclined against the direction of rotation of the drive shaft the speed of the driven shaft will be reduced.

I claim:

1. In a hydraulic power transmission for connecting a drive shaft with a coaxial driven shaft, an impeller unit rotating with the drive shaft comprising a plurality of shells forming two spaced and separate torus chambers, each oval in radial section, and having on the near sides only of the two chambers a series of fixed blades to cause the hydraulic fluid to tend to rotate with the unit, an annular core in each chamber to provide a guiding surface for the fluid rotating in opposed circular paths in the two chambers in planes thru the axis, a turbine rotor mounted on the driven shaft between the two chambers and having a series of vanes within the two chambers in proximity to the blades and the cores and lying in the path of the revolving fluid, means for pivoting the rotor vanes in the rotor to tilt the vanes with respect to the direction of flow of the fluid, and means for simultaneously moving all of the vanes, whereby to alter the speed and direction of movement of the driven shaft.

2. The device of claim 1 in which each of the vanes is bevelled at the end adjacent the fixed blades.

3. In a hydraulic power transmission for connecting a drive shaft with a coaxial driven shaft, an impeller unit rotating with the drive shaft and having therein two spaced and separate torus chambers and having on the near sides only of the two chambers a series of fixed blades for confining a portion of the fluid to cause the fluid to rotate with the drive shaft, a turbine rotor mounted on the driven shaft and carrying a plurality of spindles extending into each of the two torus chambers, vanes mounted one on each end of each spindle and means for simultaneously tilting all of the vanes to move them to or from a radial position, said means including a gear movable about the axes of the shafts and also shiftable axially.

4. In a hydraulic power transmission for connecting a drive shaft with a coaxial driven shaft, an impeller unit rotating with the drive shaft and comprising a plurality of shells forming two separate and spaced torus chambers each oval in radial cross section with the more pointed end toward the axis and having on the near side only of each of the two torus chambers a series of fixed blades to cause the hydraulic fluid to tend to rotate with the unit while leaving the outer side of each of the two torus chambers entirely free, an annular core centrally in each chamber to provide a guiding surface for the fluid rotating in opposed circular paths in the two torus chambers, a turbine rotor mounted on the driven shaft and extending between the two spaced chambers and carrying a series of movable vanes each bevelled on its edge nearest the axis of the shafts, said vanes lying in the path of the revolving fluid within each of the two torus chambers in proximity to the blades and the cores, and axially shiftable means for tilting the vanes to any desired degree.

RICHARD H. SHEPPARD.

REFERENCES CITED

The following references are of record in the file of this patent:

UNITED STATES PATENTS

| Number | Name | Date |
| --- | --- | --- |
| 2,102,425 | Lenz | Dec. 14, 1937 |
| 2,117,673 | Lysholm | May 17, 1938 |
| 2,141,940 | Sinclair | Dec. 27, 1938 |
| 2,168,350 | Lapsley | Aug. 8, 1939 |
| 2,240,270 | Schaefer | Apr. 29, 1941 |
| 2,264,845 | How | Dec. 2, 1941 |
| 2,379,183 | Price | June 26, 1945 |

FOREIGN PATENTS

| Number | Country | Date |
| --- | --- | --- |
| 315,438 | Great Britain | 1931 |
| 518,082 | Great Britain | 1940 |
| 94,287 | Switzerland | May 1, 1922 |